Aug. 20, 1963  A. G. FRAZER-NASH  3,101,096
FLUID SHUT-OFF VALVES

Filed Oct. 13, 1960  2 Sheets-Sheet 1

Inventor
A.G. Frazer-Nash

By Holcomb, Wetherill & Hinkler
Attorneys

Aug. 20, 1963   A. G. FRAZER-NASH   3,101,096
FLUID SHUT-OFF VALVES

Filed Oct. 13, 1960   2 Sheets-Sheet 2

Inventor
A. G. Frazer-Nash

United States Patent Office 3,101,096
Patented Aug. 20, 1963

3,101,096
FLUID SHUT-OFF VALVES
Archibald Goodman Frazer-Nash, 84 Kingston Hill,
Kingston-upon-Thames, England
Filed Oct. 13, 1960, Ser. No. 62,359
Claims priority, application Great Britain Oct. 16, 1959
11 Claims. (Cl. 137—628)

This invention relates to electro-magnetically operated fluid shut-off valves. The invention, although it is applicable for other purposes, is particularly concerned with a valve for releasing and shutting off a supply of air under pressure from a storage cylinder for operating pneumatic release gear which is used in aircraft for dropping stores, bombs, fuel tanks and other equipment.

To be suitable for this particular purpose the valve must be of moderate weight and size, but must be very reliable and any failure should be towards safety. Because of the limitations on the weight and size of the valve it is not practicable to provide an operating solenoid which is sufficiently powerful to perform the whole opening movement of the valve.

According to the present invention, a fluid shut-off valve comprises a closure member which is pressed by a spring onto a valve seat, an opening member which is operated by a solenoid to move the closure member from its seat against the action of the spring and a servo-mechanism which is operated by the fluid under pressure released by the moving of the closure member further from its seat to open the valve fully.

The servo-mechanism preferably comprises a cylinder with which a fluid passage in the valve, downstream of the valve seat, communicates, the cylinder having a piston which closes the passage when the closure member is on its seat but which is moved to open the passage by an increase in pressure acting on the piston when the closure member is opened. The moving piston then moves the closure member further from its seat by means of a cam mechanism. The piston may also be connected to a switch in the circuit of the solenoid, this circuit being opened to de-energize the solenoid when the piston is moved by the initial moving of the closure member from its seat. With this arrangement, a relatively small solenoid can control a valve in a high pressure fluid system.

It is desirable that the valve should close and reset itself automatically after sufficient air to operate the pneumatic release has been supplied. For this purpose the piston of the servo-mechanism may have a contra-acting piston of greater area which communicates with the fluid passage on the downstream side of the valve seat through a reservoir and a throttling opening. As soon as all the air necessary to operate the penumatic release has been supplied, the air pressure on the downstream side of the valve seat increases because the flow of air stops. Air then flows into the reservoir but only slowly because of the throttling opening. When the pressure in the reservoir, which acts on the piston of greater area, has built up sufficiently, the piston of greater area moves the smaller piston of the servo-mechanism back to its original position in which it closes the valve outlet passage. The movement of the smaller piston also re-closes the switch in the solenoid circuit and causes the cam mechanism to free the opening member so that the valve closure member is moved back on to its seat by its spring. The valve is then ready to be operated again by energising the solenoid. The throttling opening may have a valve by which its effective area can be adjusted. By adjusting the opening in this way, the time after which the valve closes automatically can be varied as required.

Any leakage through the valve in its closed position might cause the pressure downstream of the valve to build up to such an extent that the servo-mechanism and hence the release is accidentally operated.

It has been found that the seal provided by a spherical or part-spherical valve closure member on a rigid conical seat, which is a usual form of valve, is quite insufficient. In previous attempts to improve the seal, valve seats of synthetic materials such as nylon have been used. One of the requirements for valves for controlling pneumatic release gear in aircraft is however that they shall operate efficiently over a wide temperature range of, for example, plus 70° C. to minus 65° C. At temperatures near the lower limit synthetic materials such as nylon tend to harden or crack and so are not satisfactory.

To overcome these problems the valve preferably has a spherical or part-spherical closure member and a valve seat formed on the end of a thin walled resilient metal tube. The closure member is normally pressed on to the seat by a spring which causes the closure member to force the wall of the tube resiliently outwards so that the seat is pressed by its own resilience against the closure member. It has been found that with such a seating an excellent seal can be obtained, and as the seat is of metal, the seal remains good at temperatures at least down to minus 65° C.

Since, as has already been mentioned it is important that leakage of air past the valve must be kept to a very small limit, the closure member and the valve seat may need servicing or replacing from time to time. It is desirable that this should be able to be done without it being necessary to dismantle the valve to any great extent. To this end, the valve seat, closure member and a spring, which holds the closure member on the seat, may be constructed as a separate unit which fits in a socket in the body of the valve and is held in position by a plug or a cap which is externally accessible on the valve body. By this means, the seat and closure member can easily be removed by removing the plug or cap which may be screw threaded and it is not necessary to disturb any other parts of the valve.

To guard against electrical breakdown, it is preferable that the valve should be able to be operated by either one or both of two solenoids which are in independent electrical circuits. For this purpose the opening mechanism may comprise two solenoids having armatures connected one to each arm of a two-armed pivoted lever, rocking of which opens the valve. One means of effecting this is by arranging one solenoid when energised to push one arm of the lever and the other to pull the other arm. The connections between the armatures and the arms of the lever both include lost-motion devices which allow the lever to be rocked by one of the solenoids without moving the armature of the other.

To ensure that the opening mechanism is not operated accidentally due to inertia forces when the valve is mounted in an aircraft in flight, the armatures of the two solenoids are preferably mass balanced. This balancing may be effected by a further lever for each solenoid, pivoted about the same axis as the lever in the opening mechanism. Each further lever has one of its arms connected to the solenoid and has a balancing weight on its other arm.

An example of a valve in accordance with the present invention is illustrated in the accompanying drawings in which.

Figure 1:
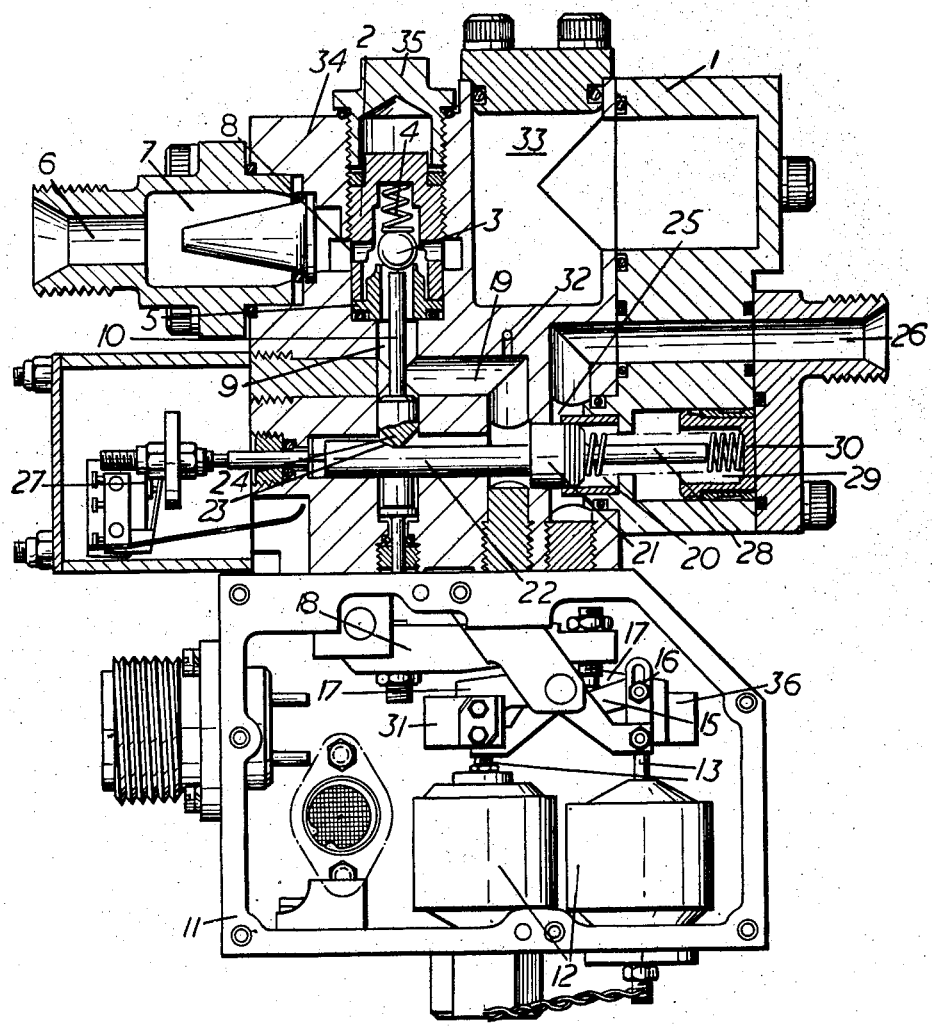
FIGURE 1 is a vertical section through the valve.
Figure 2:
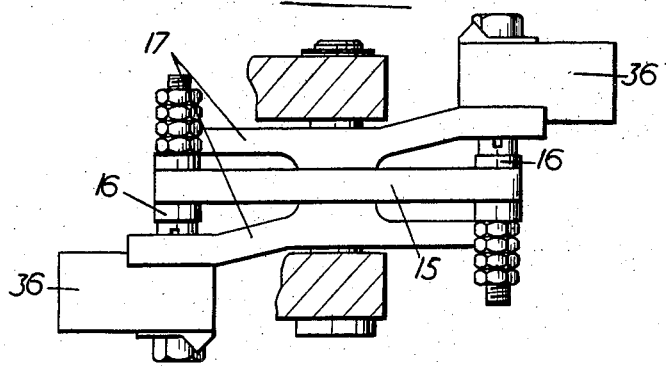
FIGURE 2 is a view looking vertically downwards on the mass balancing levers.
Figure 3:
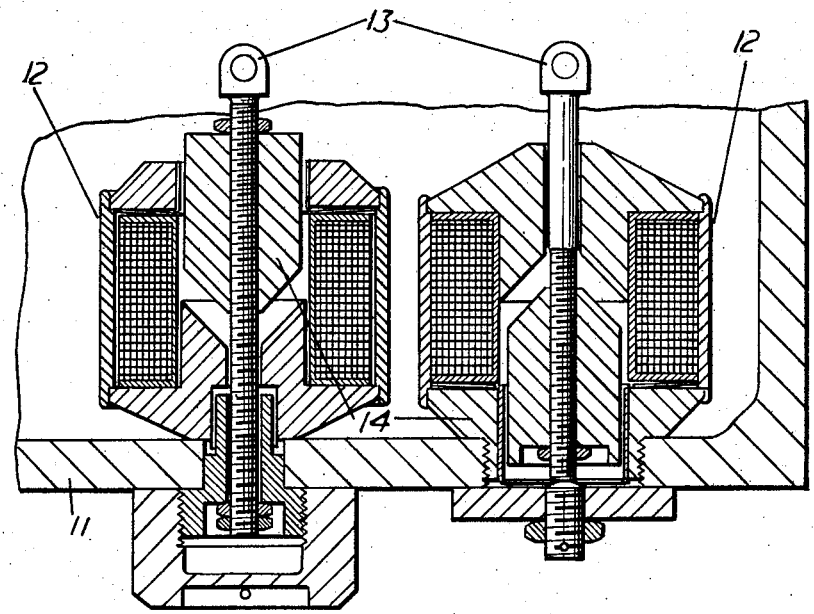
FIGURE 3 is a vertical section through the two solenoids.

The valve has a main body 1 which contains a capsule 2 which comprises a ball closure member 3 which is retained on its seating by a return spring 4. The seating is formed by the tapered end of a resilient metal alloy tube 5. The body 1 has an air inlet opening 6 on one side which communicates with a chamber holding a filter 7. On the far side of the filter from the inlet opening is a duct 8 which leads to the upstream side of the capsule 2. The lower end of the tube 5, which forms the outlet from the valve seat, communicates with a vertical bore 9 in the body. In this bore is a vertical push rod 10 which slides up and down in guides. Normally, when the valve is closed and the ball is held on its seat by its spring, the push rod is in its lowermost position. The lower end of the push rod extends into a casing 11 which houses two solenoids 12. The solenoids are mounted side by side and each has an operating member 13 extending upwards from its armature 14, which is movable upwards and downwards. The operating member of one armature is connected to one arm of a horizontally pivoted lever 15 by a pin and slot connection 16, and the operating member of the other armature is similarly connected to another arm of the lever. Pivoted on the same axis as the lever 15 are two further levers 17. Each of the levers 17 has two arms, one of which is attached to the operating member of one armature and the other of which carries a counter-balancing weight 31 which mass balances the armature. The bottom of the push rod 10 is connected by an adjustable screw connection to an operating lever 18 which is pivoted at one end, and thus only has a single arm. The end of this arm remote from its pivot bears against the horizontal lever 15 connected to the operating member 13 of the two armatures adjacent its pivot point. When the two solenoids 12 are energised, the armature of one moves upwards and the armature of the other moves downwards. The lever 15 is thus rocked in a counterclockwise direction. The rocking of this lever pushes the operating lever 18 upwards and this in turn pushes the push rod 10 upwards so that it engages with the bottom of the ball 3 and lifts this from its seating to open the valve. Should one of the solenoids fail, then the other solenoid by itself will rock the lever 15. The first solenoid remains inactive and its armature is not moved because the pin and slot of the connection 16 by which it is connected to the lever 15, move relatively to each other so that the motion of the lever is lost.

The solenoid operating mechanism only lifts the ball 3 a very small distance off its seating so that the valve is partially opened. When this happens, compressed air which enters the inlet 6 through an attached pipe, can pass through the valve seat but is subjected to a throttling action because the valve is only partially opened. The air then flows down through the bore 9 in the body, past the push rod 10 and into a communicating cross bore 19. This cross bore 19 leads into a cylinder 20 in the body which contains a spring-loaded piston 21. The air pressure acting on the piston 21 moves the piston against its spring and this also moves a rod 22 connected to the piston. This rod 22 has an inclined cam surface 23 which is in contact with a cam follower 24 on the push rod. The inclined cam surface 23 moves against the follower 24 and so raises the push rod causing it to move the ball further off its seat and so open the valve fully. The whole operation takes less than 0.03 second.

In its initial position in which it is held by its spring, the piston 21 closes an outlet opening 25 in the wall of its cylinder. When the piston is moved by the air pressure against the action of its spring, however, this outlet opening 25 is uncovered and the compressed air passes through it to an outlet 26 in the side of the valve body 1 remote from the inlet 6.

The piston rod 22 also carries an electrical contact 27, which, when the piston and rod are in their initial positions, touches a second contact. These two contacts are in the circuits of the two solenoids. Thus initially these circuits are closed, but when the piston rod moves and the contacts are parted, the solenoids are de-energised.

The piston 21 has a spigot 28 projecting from its crown in the opposite direction from that in which the piston rod extends. This spigot 28 projects into a further cylinder 29 in which there is a further piston 30. This piston 30 has a larger facial area than the piston 21 and is normally held out of contact with the spigot by a light spring. When the valve has been opened and compressed air has flowed through it to operate a release mechanism which the valve controls, the air pressure on the outlet side of the valve builds up because after the release mechanism has been operated, no further air flows through it. The air in the outlet of the valve may now pass through a throttling opening 32, the size of which may be adjusted by a needle valve (not shown), into a reservoir 33 in the valve body. This reservoir communicates with the cylinder 29, containing the larger piston 30, through a duct (not shown) in the body. The pressure in the rservoir gradually builds up as air flows through the throttling opening and when this air pressure is sufficient, it moves the larger piston 30 against the action of its spring until the piston 30 comes into contact with the spigot 28. The first piston 21 is then forced back to its original position in which it covers the outlet opening 25 from its cylinder. This closes the outlet from the valve and also moves the cam surface 23 on the piston rod 22 away from the follower 24 on the push rod 10. The push rod is then free to move downwards again under the action of the thrust which it receives from the ball 3 which is acted upon by its closing spring. The ball therefore returns to its seat and the valve is completely closed.

As the piston rod 22 moves back to its initial position, the contact 27 which it carries again touches its cooperating contact so that the circuit through the two solenoids is again established and the valve is ready to be operated again by the closure of a master switch in the circuits of the solenoids 12.

The time taken for the valve to close again automatically in the manner described is dependent upon the time taken for the air pressure to build up in the reservoir 33 in the valve body. This can be adjusted by opening or closing the needle valve. A typical time for the resetting of the valve is 5 seconds.

In spite of the efficiency of the seal produced by the ball 3 on the seating, a very slight leakage of air may take place. Were this pressure to build up in the valve it would leak past the piston 21 and out of the outlet 26 of the valve where again the pressure would build up gradually until it could operate the release mechanism accidentally. To prevent this happening, there is a small pressure relief hole (not shown) which communicates with the atmosphere from the passage between the valve seat 5 and the piston 21. When the piston 21 is moved by the action of the air upon it, this hole is closed by a part projecting from the rod 22.

The valve capsule 2 comprising the valve seat, the ball 3 and its spring, is seated metal to metal in the valve body. Should the valve seat be faulty, the whole capsule can be replaced by another identical capsule which will seat in exactly the same position so that adjustment of the push rod or other parts of the valve mechanism is not necessary. The capsule is held in position in its socket 34 by a screw threaded cap 35 which is screwed into an internal thread in the socket. The cap has a copper sealing ring to prevent air leakage around it.

I claim:

1. A fluid shut-off valve comprising a housing defining a fluid inlet passage and a fluid outlet passage, an annular valve seat between said passages, a valve closure member, spring means normally holding said closure member on said seat and a valve opening mechanism for moving said closure member off said seat against the action of said spring, said opening mechanism comprising solenoid means, first connecting means operatively connecting said solenoid means to said closure member whereby operation of said solenoid means partially opens said valve and a servo-mechanism actuated by the pressure of fluid admitted through said partially opened valve for augmenting the movement of said closure member, said servo-mechanism comprising a cylinder forming a part of said outlet passage, a piston in said cylinder, said piston being mounted to normally obstruct and close said outlet passage but to move automatically to a passage opening position in response to the pressure of fluid admitted through said valve to said passage upon movement of said closure member from said seat by operation of said solenoid means, and second connecting means operatively connecting said piston and closure member to move said closure member farther from its seat as said piston is moved to its passage opening position.

2. A valve according to claim 1 comprising cam mechanism through which the piston moves the closure member.

3. A valve according to claim 1 comprising a switch in the circuit of the solenoid, the switch being operatively connected to said piston and opened to de-energize the solenoid upon movement of the piston to open the passage.

4. A valve as claimed in claim 1 comprising a contra-acting piston which is of greater effective area than the first piston, a storage chamber and a throttling opening through which said contra-acting piston is in communication with said passage downstream of the valve seat, said contra-acting piston being positioned to act on said first piston and move it back into the position in which it closes the fluid passage when the fluid pressure in the chamber increases because of flow from the passage through the throttling opening.

5. A valve according to claim 4, in which the effective area of the throttling opening is adjustable.

6. A valve according to claim 1, in which the closure member has a part-spherical seating surface and the valve seat is formed on the end of a resilient metal tube, the valve closure spring being sufficiently strong to cause the closure member to force the wall of the tube resiliently outwards so that the seat is pressed by its own resilience against the closure member when the valve is closed.

7. A valve according to claim 6, in which the valve seat, the closure member and the spring are constructed as a separate unit which is independently removable from the valve body without dismantling any other parts of the valve mechanism.

8. A valve according to claim 7, in which the separate unit fits in a socket in the valve body and is held in the socket by a plug or cap which is externally accessible on the valve body.

9. A valve as claimed in claim 1 comprising a two-armed pivoted lever which operates the first connecting means and two operating solenoids having armatures connected one to each arm of said lever, so that rocking of the lever upon energization of either solenoid moves the closure member from its seat.

10. A valve according to claim 9, in which the armatures are connected to the lever through lost-motion connections which allow the lever to be rocked by either one of the solenoids without moving the armature of the other.

11. A valve according to claim 10, in which two further two-armed levers are pivoted about the same axis as the first lever, one of the further levers having one arm attached to one armature and the other further lever having one arm attached to the other armature and the other arms of both levers being weighted so that the armatures are mass-balanced.

References Cited in the file of this patent

UNITED STATES PATENTS

| | | |
|---|---|---|
| 484,843 | Bavier | Oct. 25, 1892 |
| 1,393,555 | Lockyer | Oct. 11, 1921 |
| 2,661,022 | Latour | Dec. 1, 1953 |
| 2,679,263 | Kiser | May 25, 1954 |
| 3,054,422 | Napolitano | Sept. 18, 1962 |